US012692905B2

(12) United States Patent
Kim et al.

(10) Patent No.: US 12,692,905 B2
(45) Date of Patent: Jul. 28, 2026

(54) UNIVERSAL JOINT

(71) Applicants: HYUNDAI MOTOR COMPANY,
Seoul (KR); KIA CORPORATION,
Seoul (KR)

(72) Inventors: Jong Min Kim, Gwangmyeong-si
(KR); Tae Kyun Kim, Hwaseong-si
(KR)

(73) Assignees: HYUNDAI MOTOR COMPANY,
Seoul (KR); KIA CORPORATION,
Seoul (KR)

( * ) Notice: Subject to any disclaimer, the term of this
patent is extended or adjusted under 35
U.S.C. 154(b) by 336 days.

(21) Appl. No.: 18/508,819

(22) Filed: Nov. 14, 2023

(65) Prior Publication Data

US 2025/0012329 A1      Jan. 9, 2025

(30) Foreign Application Priority Data

Jul. 6, 2023 (KR) ........................ 10-2023-0087665

(51) Int. Cl.
F16D 3/38 (2006.01)
(52) U.S. Cl.
CPC ............. F16D 3/387 (2013.01); F16D 3/385
(2013.01)

(58) Field of Classification Search
CPC ................................. F16D 3/387; F16D 3/385
USPC .......................................... 464/134; 403/236
See application file for complete search history.

(56) References Cited

U.S. PATENT DOCUMENTS

| | | | | |
|---|---|---|---|---|
| 3,222,143 A | * | 12/1965 | Macchini | ................ F16D 3/387 |
| 4,583,960 A | * | 4/1986 | Joyner | .................... F16D 3/387 |
| | | | | 464/134 |
| 7,695,372 B2 | * | 4/2010 | Tokioka | .................. F16D 3/387 |
| | | | | 464/134 |
| 11,480,218 B2 | * | 10/2022 | Chung | .................... F16D 3/387 |

FOREIGN PATENT DOCUMENTS

KR          102188802 B1      12/2020

* cited by examiner

*Primary Examiner* — Greg Binda
(74) *Attorney, Agent, or Firm* — Lempia Summerfield
Katz LLC

(57) ABSTRACT

A universal joint configured to reduce the steering friction
by decreasing the bending torque of a yoke. The universal
joint includes a body portion formed at one end of a yoke for
a shaft to be coupled thereto, a wing portion formed at the
other end of the yoke for a bearing to be pressed thereinto,
and a rigidity-weakening portion formed in a shape of a
reduced cross-sectional area in a portion extending from the
body portion to the wing portion.

8 Claims, 11 Drawing Sheets

stress
formation
(deformation)

| | | conventional type | present invention |
|---|---|---|---|
| ▨ | fastening force (Shaft) | 14,724.8 | 15,151.6 |
| ◲ | CAP-A (bearing portion) | 20,757.8 | 4,965.2 |
| ▨ | CAP-B (bearing portion) | 2,913.0 | 2,687.0 |
| ▨ | difference between right and left (Cap difference) | 17,844.8 | 2,278.2 |
| ▨ | friction (Cap sum) | 23,670.8 | 7,652.2 |

UNIVERSAL JOINT

CROSS REFERENCE TO RELATED APPLICATION

The present application claims priority to Korean Patent Application No. 10-2023-0087665, filed Jul. 6, 2023, the entire contents of which is incorporated herein for all purposes by this reference.

BACKGROUND

Field

The present disclosure provides a universal joint configured to reduce steering friction by decreasing the bending torque of a yoke.

Description of the Related Art

As illustrated in FIG. 1, in the case of the rack-mounted motor driven power steering (R-MDPS), a torque sensor 2 is installed below a universal joint 1.

Accordingly, the assist force of the MDPS motor 3 does not consider the friction of the universal joint 1, so the friction of the universal joint is directly transmitted to the driver while the MDPS is in a power-on state.

On the other hand, the friction of the universal joint installed in the vehicle is affected by the bending torque of the universal joint.

In other words, the friction of the universal joint increases as the bending torque increases.

For example, when a bolt (not shown) is fastened to a hollow-shaped tab 7 formed in a yoke 4 to couple the yoke 4 and a shaft 8 together as illustrated in FIG. 2, the yoke 4 deforms as a whole as the gap in a slit 5 decreases.

When the yoke 4 deforms, the bending torque increases, stress is formed in a hollow portion 6, and the hollow portion, which is away from the yoke and into which a bearing is pressed, deforms. As a result, the pressure in the bearing increases compared to before the bolt is fastened, and the bending torque increases.

As the pressure on the bearing increases this way, it leads to an increase in the magnitude of the vertical load (N) in the rotational friction of the universal joint (F=p×N), resulting in an issue of increased friction in the universal joint.

The matters described above as background technology are intended to provide a better understanding of the background of the present disclosure and should not be considered as acknowledging that the present disclosure pertains to the prior art already known to those having ordinary skill in the art.

SUMMARY

The present disclosure is proposed to resolve the issues described above, and an object of the present disclosure is to provide a universal joint configured to reduce the bending steering friction by decreasing the bending torque of a yoke.

According to an embodiment of the present disclosure, a universal joint includes: a body portion formed at one end of a yoke for a shaft to be coupled thereto, a wing portion formed at the other end of the yoke for a bearing is pressed thereinto, and a rigidity-weakening portion formed in a portion extending from the body portion to the wing portion and having a reduced cross-sectional area.

The rigidity-weakening portion may be formed in a shape extending from the body portion to the wing portion and having a concave outer surface.

The radius of the concave shape of the concave outer surface may range from 6 to 14 mm.

The concave shape may be formed on the right and left sides of the wing portion respectively.

The concave shape may be symmetrically formed on the right and left sides of the wing portion.

A slit may be formed in the radial direction of a shaft hole formed in the body portion, and the slit may be formed between rigidity-weakening portions.

A hollow portion side end of the slit may be positioned at a least thick portion of the rigidity-weakening portion.

The least thick portion of the rigidity-weakening portion may be formed at a position a predetermined distance away from the edge of the hollow portion.

The inner diameter of the shaft hole may range from 16 to 18 mm, and the outer diameter of the body portion forming the shaft hole may range from 25 to 27 mm.

An intermediate yoke connected to the yoke via a spider having a bearing and an intermediate shaft portion integrally formed with a body portion of the intermediate yoke may be further included.

The intermediate shaft portion may have a solid shaft shape or a hollow shaft shape.

According to the present disclosure, the stress causing deformation in the yoke concentrates in the rigidity-weakening portion when a bolt is fastened to the yoke so that deformation in the hollow portion in which the bearing is assembled is prevented. As a result, there is the advantage of reducing the amount of increase of the bending torque of the yoke, thus reducing the friction of the universal joint and reducing the steering friction of an actual vehicle.

Further, the intermediate yoke and the intermediate shaft portion are integrally formed rather than welded together so that an increase in the frictional force is blocked before a bolt is fastened. As a result, there is the effect of reducing the overall friction of the universal joint.

BRIEF DESCRIPTION OF THE PRESENT DISCLOSURE

DETAILED DESCRIPTION

Figure 1:
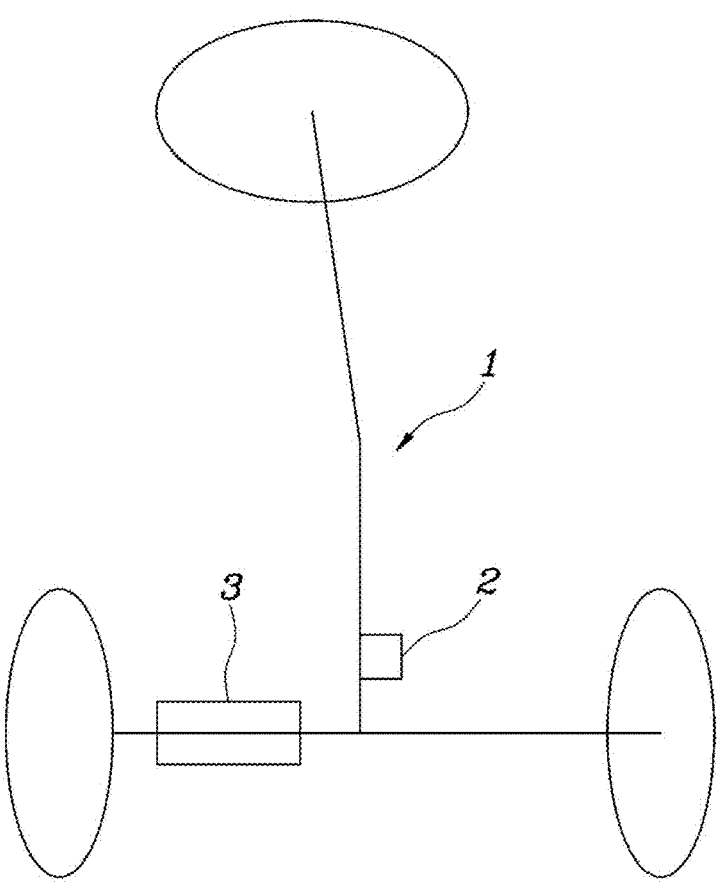
FIG. 1 is a view illustrating an installation location of a torque sensor in an R-MDPS structure.

Hereinafter, embodiments disclosed in the present disclosure are described in detail with reference to the accompanying drawings, but the same reference numerals are assigned to the similar or same components regardless of drawing numbers and repetitive descriptions have been omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description has been omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed.

Singular expressions include plural expressions unless the context explicitly indicates otherwise. When a component, device, element, or the like of the present disclosure is described as having a purpose or performing an operation, function, or the like, the component, device, or element should be considered herein as being "configured to" meet that purpose or to perform that operation or function.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

The description of embodiments of the present disclosure with reference to the accompanying drawings is as follows.

Figure 3:
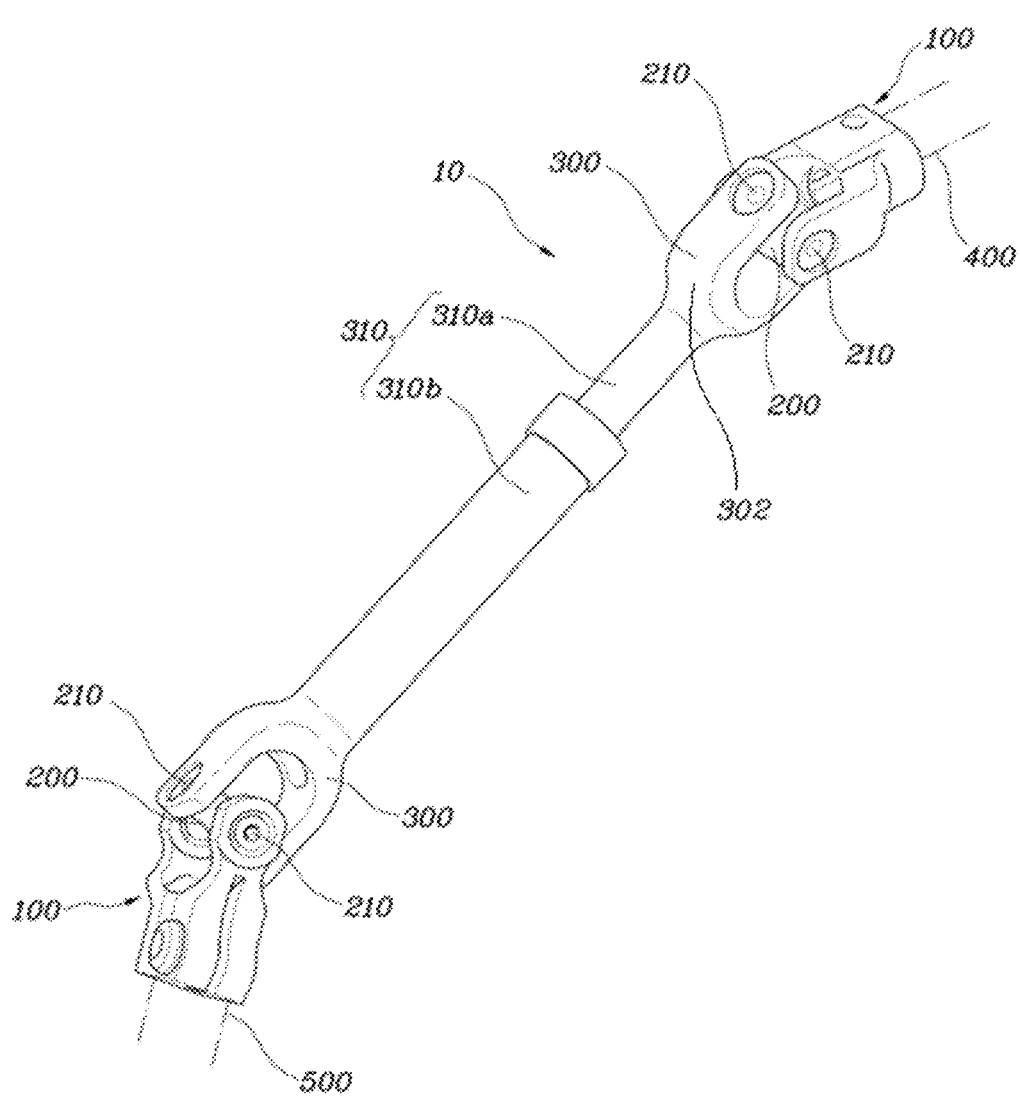
FIG. 3 is a view illustrating a universal joint applied to a steering device according to an embodiment of the present disclosure.
Figure 4:
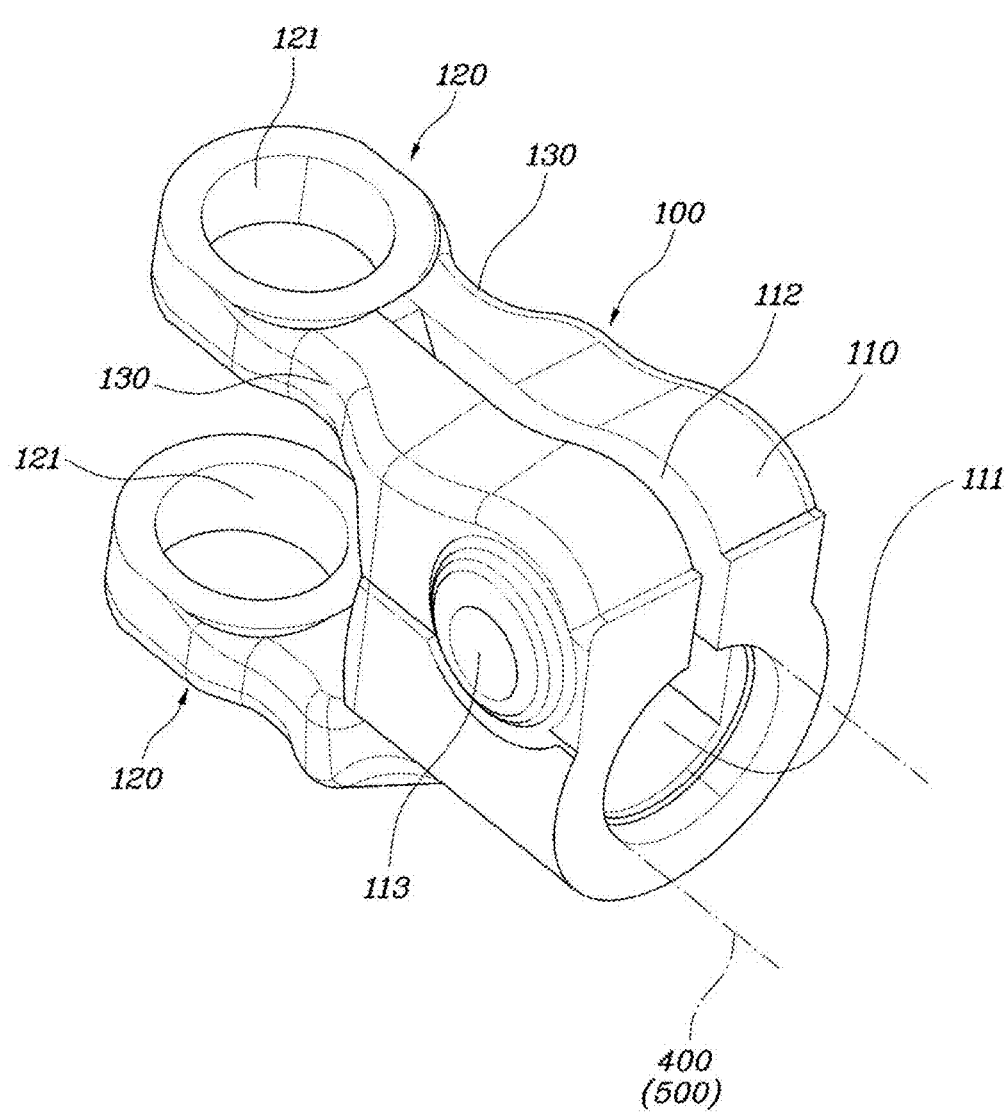
FIG. 4 is a view illustrating a shape of a yoke according to an embodiment of the present disclosure.

According to an embodiment of the present disclosure, as illustrated in FIGS. 3 and 4, a universal joint 10 includes a body portion 110 formed at one end of a yoke 100 for shafts 400, 500 to be coupled thereto, a wing portion 120 formed at the other end of the yoke 100 for a bearing 210 to be pressed thereinto, and a rigidity-weakening portion 130 formed in a shape of a reduced cross-sectional area in a portion extending from the body portion 110 to the wing portion 120 to reduce rigidity.

As illustrated in FIGS. 3 and 4, the shaft 400, coupled to a steering column side lower end, is connected to a solid shaft 310*a*, by the universal joint 10. The solid shaft 310*a* is assembled at an upper end of an intermediate shaft portion 310.

The shaft 500, coupled to a gearbox side upper end, is connected to a hollow shaft 310*b*, by the universal joint 10. The hollow shaft 310*b* is assembled at a lower end of the intermediate shaft portion 310.

In the universal joint 10 connected to an upper portion of the intermediate shaft portion 310, the yoke 100, coupled to the steering column side lower shaft 400, is rotatably connected via the spider 200 to the intermediate yoke 300 coupled to the upper end of the solid shaft 310*a*.

And, in the universal joint 10 connected to a lower portion of the intermediate shaft portion 310, the yoke 100, coupled to the gearbox side upper shaft 500, is rotatably connected via the spider 200 to the intermediate yoke 300 coupled to the lower end of the hollow shaft 310*b*.

As a result, the universal joint 10 is applicable to both the universal joints 10 connected to the steering column side and the gearbox side. For the convenience of understanding, the following description is based on the universal joint 10 connected to the steering column side.

The body portion 110 is formed at the upper end of the yoke 100, and the wing portion 120 is formed in a shape branching right and left at the lower end of the yoke 100 in the body portion 110.

A cylindrical shaft hole 111 is formed in the center of the body portion 110 in the shaft direction such that the lower end of the steering column side shaft 400 is inserted thereinto.

A hollow portion 121 is formed in the shape of a circular hole at the end of both wing portions 120 such that a bearing 210 coupled to a spider 200 is press-coupled to the hollow portion 121.

In addition, a slit 112 having a predetermined gap in the outer radial direction of the shaft hole 111 is formed along the shaft hole 111 up to a portion extending to the hollow portion 121.

A bolting hole passing through the body portion 110 in the direction orthogonal to the gap in the slit 112 is formed such that a bolt 113 is fastened to the bolting hole.

Accordingly, as the bolt 113 is fastened, the gap in the slit 112 is reduced and the inner diameter of the shaft hole 111 is reduced. As a result, the shafts 400, 500 can be tightly fastened in the shaft hole 111.

In an embodiment of the present disclosure, the rigidity-weakening portion 130 is formed in the middle portion of the wing portion 120 extending from the body portion 110 to the hollow portion 121. The rigidity-weakening portion 130 is formed in a shape of a reduced cross-sectional area so that the rigidity is reduced and parts easily deform in the event of deformation.

Accordingly, when the bolt 113 is fastened, the stress causing the deformation in materials by the rigidity-weakening portion 130 concentrates in the rigidity-weakening portion 130 even if the body portion 110 in which the bolt 113 is assembled deforms so that deformation in the hollow portion 121 in which the bearing 210 is assembled is prevented. Accordingly, the bearing operates smoothly even when the bolt is fastened so that the amount of increase of the bending torque is reduced and the overall friction of the universal joint 10 is reduced. As a result, the steering friction of the actual vehicle is reduced.

Figure 5:
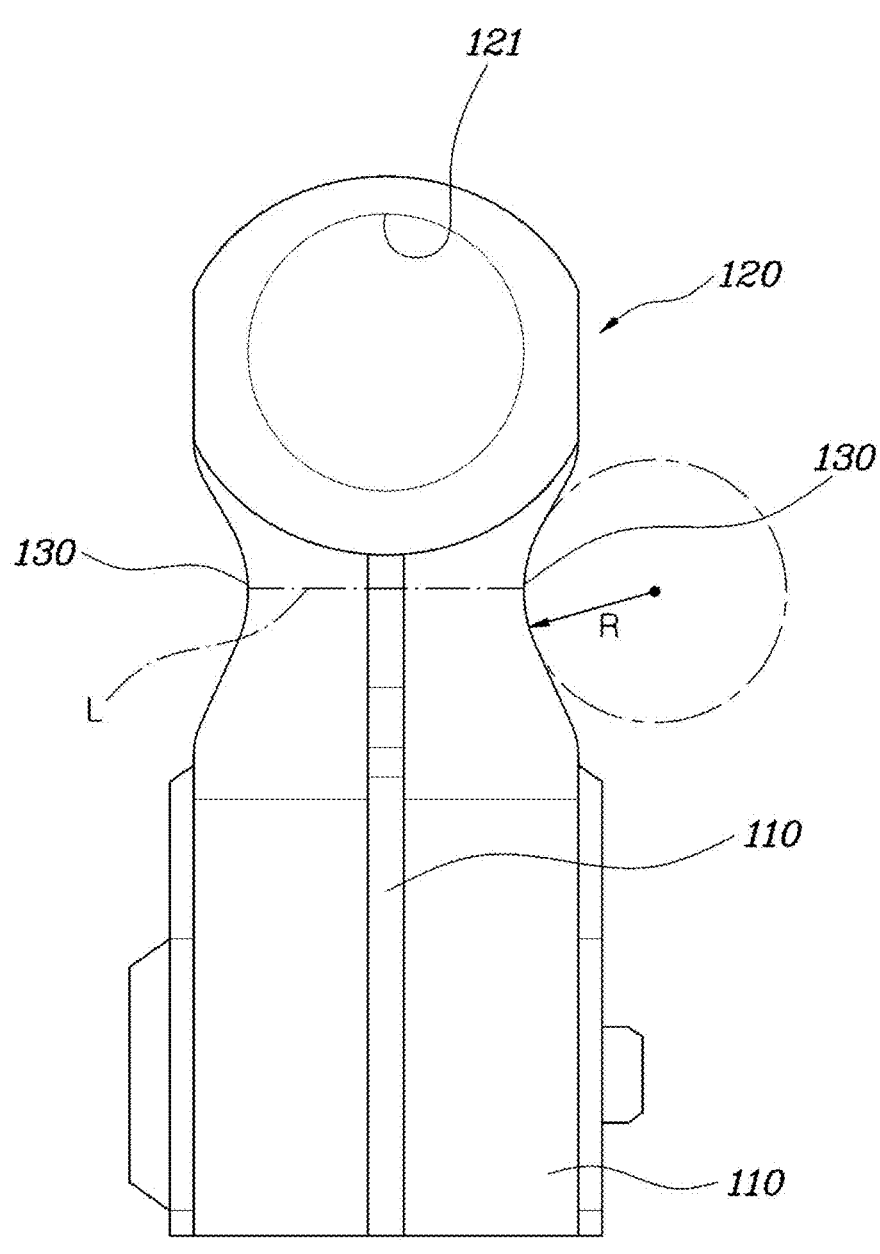
FIG. 5 is a view illustrating a concave shape of a rigidity-weakening portion according to an embodiment of the present disclosure.

In addition, as illustrated in FIGS. 4 and 5, according to the present disclosure, the rigidity-weakening portion 130 may be formed in a shape extending from the body portion 110 to the wing portion 120 and having a concave outer surface.

Figure 2:
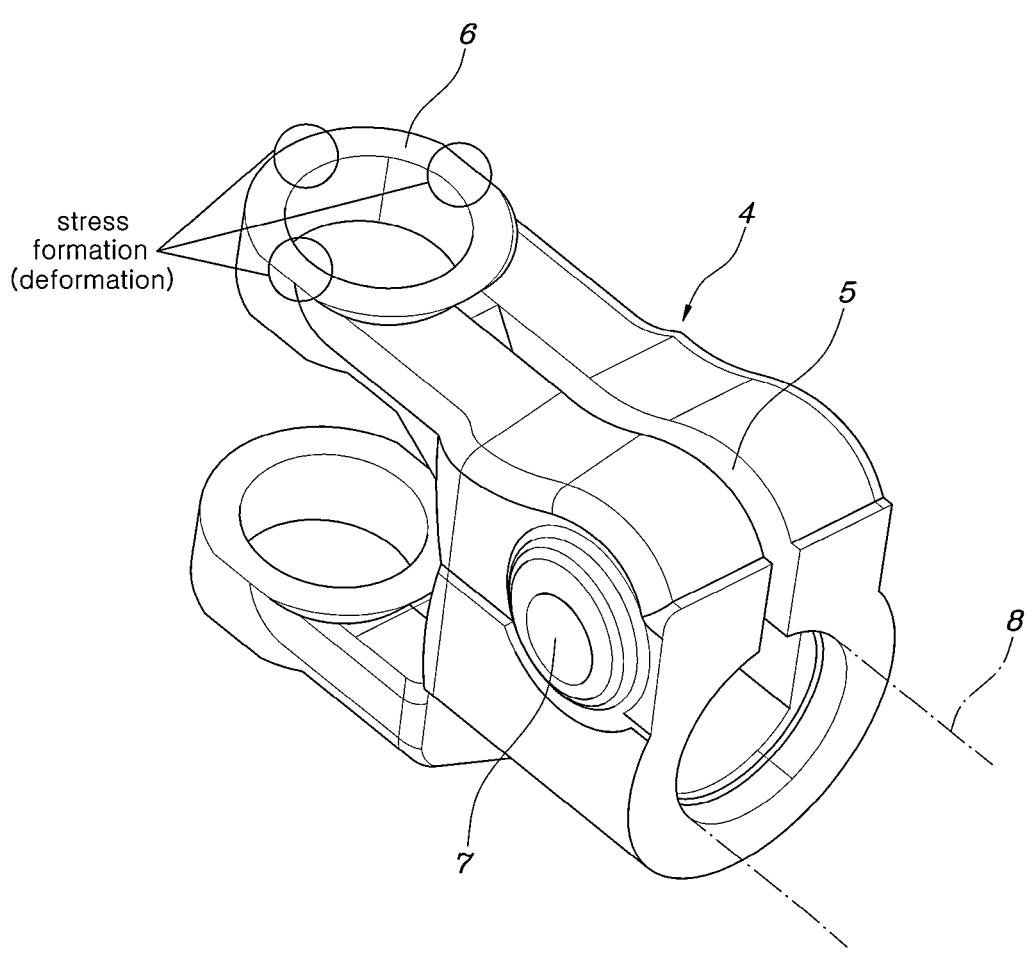
FIG. 2 is a view illustrating a shape of a conventional yoke.

In other words, while a conventional yoke has a straight outer surface extending from the body portion 110 to the wing portion 120 as illustrated in FIG. 2, the yoke according to the present disclosure has a concave portion 130 formed in a concave shape in a midportion of the outer surface extending from the body portion 110 to the wing portion 120 such that the cross-sectional area of the concave portion 130 is reduced.

By reducing the stress that causes deformation in the intermediate body (121) material, it becomes possible to reduce the increase in bending torque.

In one embodiment, the radius R of the concave shape may range from 6 to 14 mm.

In other words, the concave portion 130 is formed in a circular curved shape having a radius R of 6 to 14 mm on the right and left outer surfaces of the wing portion 120.

When the radius R of the concave portion 130 is less than 6 mm, the concave portion 130 is not sufficiently thick, leading to a lack of torsional strength and durability. If the radius R of the concave portion 130 is greater than 14 mm, the concave portion 130 is excessively thick, leading to the deformation in the hollow portion 121 when the body portion 110 deforms.

In addition, the concave shape may be formed on the right and left sides of the wing portion 120 respectively.

Further, the concave shape may be symmetrically formed on the right and left sides of the wing portion 120.

In other words, the concave portions 130 is formed in the same shape at the same location on the right and left sides of the wing portion 120 so that the wing portion 120 deforms uniformly on the right and left side when the body portion 110 deforms by the fastening of the bolt 113. As a result, the stress is not lopsided, meaning it prevents stress from becoming skewed in one direction. This, in turn, helps maintain rigidity and durability.

In another embodiment, as illustrated in FIG. 5, a slit 112 may be formed in the radial direction of a shaft hole 111 formed in the body portion 110, and the slit 112 may be formed between rigidity-weakening portions 130.

For example, the slit 112 is formed between the right and left concave portions 130.

In other words, when the bolt 113 is fastened, the gap in the slit 112 changes and the body portion 110 deforms.

Accordingly, the stress causing the deformation in the body portion 110 concentrates in the concave portion 130 due to the decreased gap in the slit 112 so that the transmission of the stress causing the deformation in the body portion 110 to the hollow portion 121 is reduced.

In addition, the hollow portion 121 side end of the slit 112 is positioned at the least thick portion of the rigidity-weakening portion 130, i.e., the least thick portion of the concave portion 130.

At this time, a straight line L connecting the most recessed portions of the concave portion 130 becomes the least thick portion, and the end of the slit 112 positioned closest to the hollow portion 121 becomes the hollow portion 121 side end of the slit 112.

In other words, the hollow portion 121 side end of the slit 112 coincides with the straight line L which is the least thick portion of the concave portion 130, which helps concentrate the stress causing deformation in the body portion 110 in the concave portion 130.

In addition, the least thick portion of the rigidity-weakening portion 130 may be formed at a position a predetermined distance away from the edge of the hollow portion 121.

In other words, the stress causing deformation in the body portion 110 concentrates in the concave portion 130 and the concave portion 130 is formed at a position a predetermined distance away from the hollow portion 121 so that transmission of the stress to the hollow portion 121 is more effectively reduced.

Figure 6:
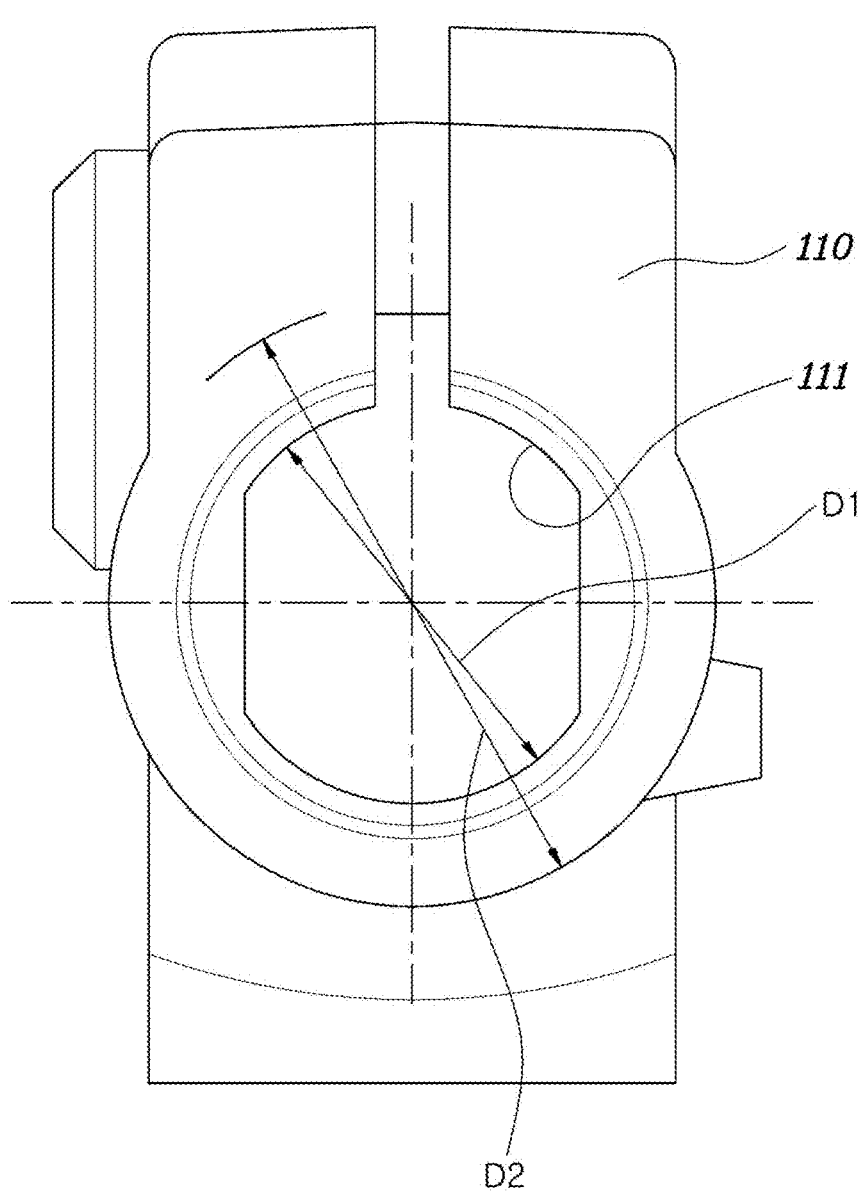
FIG. 6 is a view illustrating a shaft hole formed in a body portion according to an embodiment of the present disclosure.

On the other hand, FIG. 6 shows that the inner diameter D1 of the shaft hole 111 may range from 16 to 18 mm, and the outer diameter D2 of the body portion 110 forming the shaft hole 111 may range from 25 to 27 mm.

In one embodiment, the body portion 110 can be formed such that the outer diameter D2 is 26 mm when the inner diameter D1 of the shaft hole 111 is 17 mm.

In other words, while the outer diameter D2 of the body portion 110 is set to 30 mm or more in the conventional yoke so that the body portion 110 is thick, the diameter D2 of the body portion 110 according to the present disclosure is reduced.

Accordingly, the thickness of the body portion 110 is reduced by as much as the outer diameter D2 of the body portion 110 is reduced so that the fastening force of the shafts 400, 500 when the bolt 113 is fastened is enhanced. In addition, the rigidity of the part fastening the body portion 110 decreases so that the deformation in the hollow portion 121 in which the bearing is seated is also reduced relatively.

Figure 8:
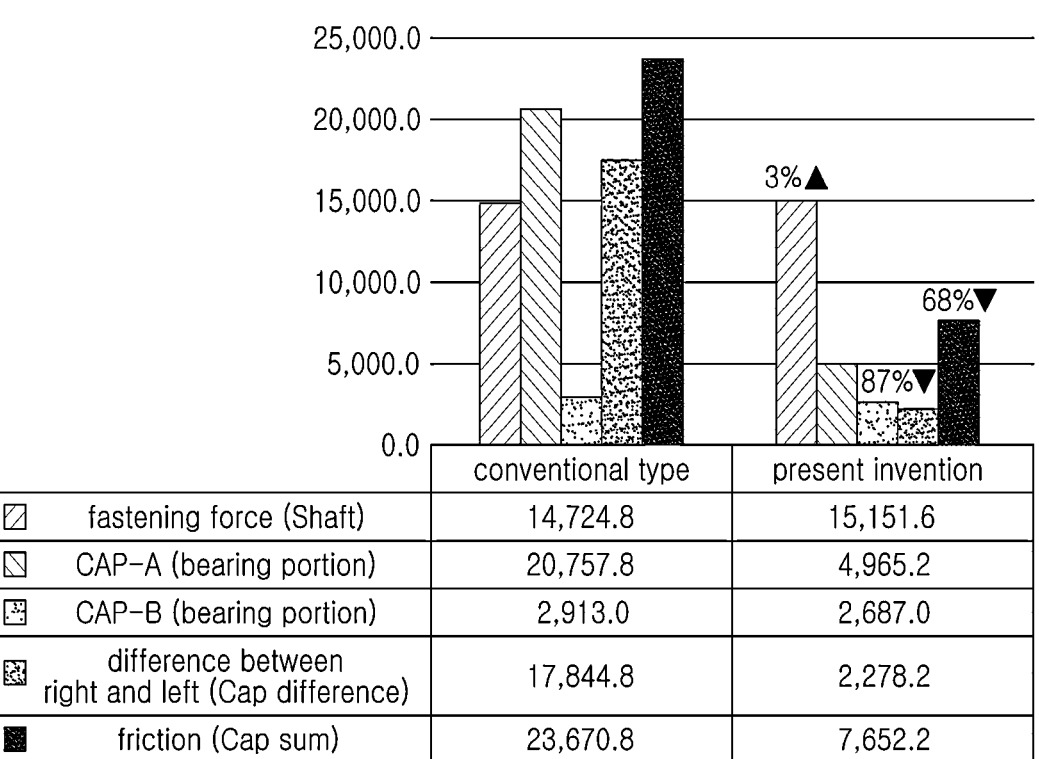
FIG. 8 is a graph comparing fastening forces and friction analysis values of a conventional universal joint and a universal joint according to the present disclosure.

In other words, as illustrated in FIG. 8, the bending torque and friction of the bearing 210 pressed from the side where the bolt 113 is fastened are significantly reduced in the yoke 100 of the present disclosure compared to a conventional yoke.

Accordingly, the sum of the friction in the bearings 210 on both sides is reduced by about 68% so that the steering friction of the actual vehicle is significantly reduced.

Figure 9:
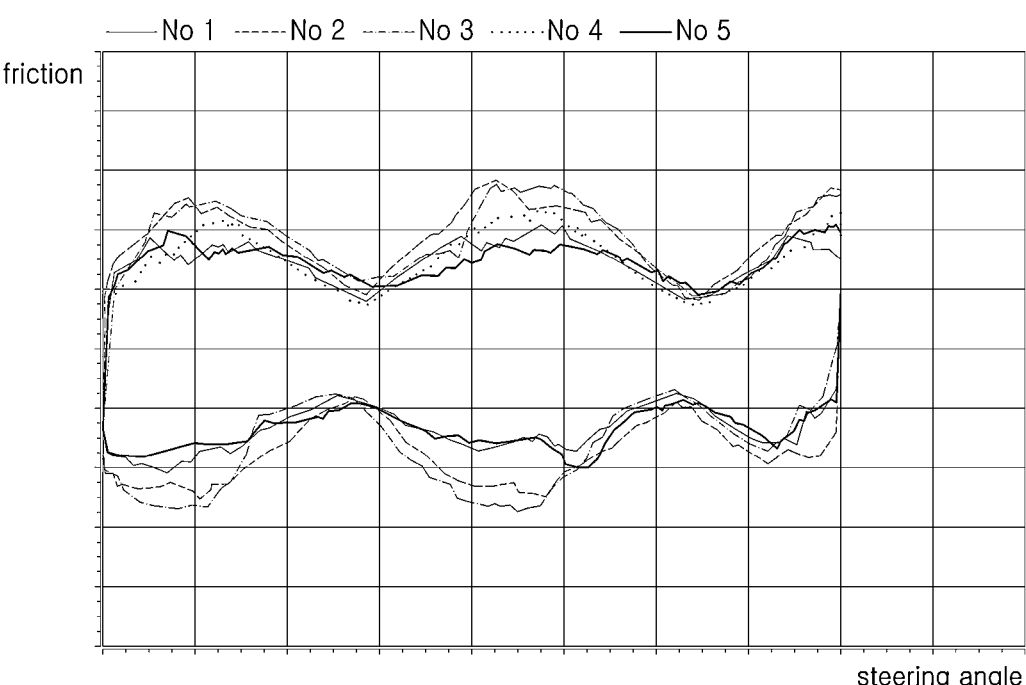
FIGS. 9 and 10 are graphs comparing friction measurements for steering angles of a conventional universal joint and a universal joint according to the present disclosure.
Figure 10:
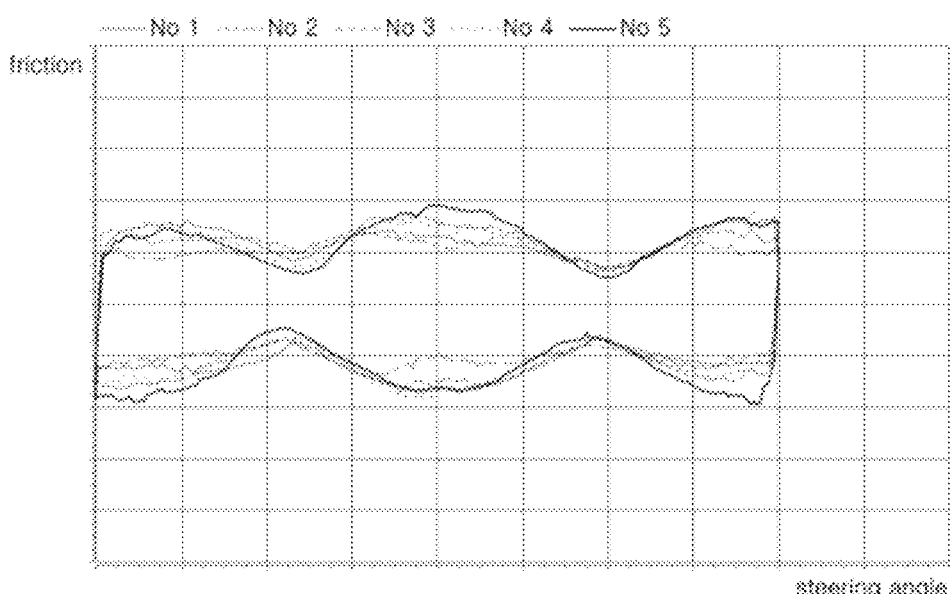

Further, as illustrated in FIGS. 9 and 10, test results from the application to a plurality of vehicles confirm that the present disclosure significantly reduces friction caused by steering angle changes, compared to the conventional universal joint.

Accordingly, the overall steering feel significantly improves, and not only is the steering feel such as the restoration sensation cleaner and enhanced, but also a driver better senses the road feedback and texture, resulting in improved on-center accuracy, faster responsiveness, and smoother restoration sensation.

Figure 7:
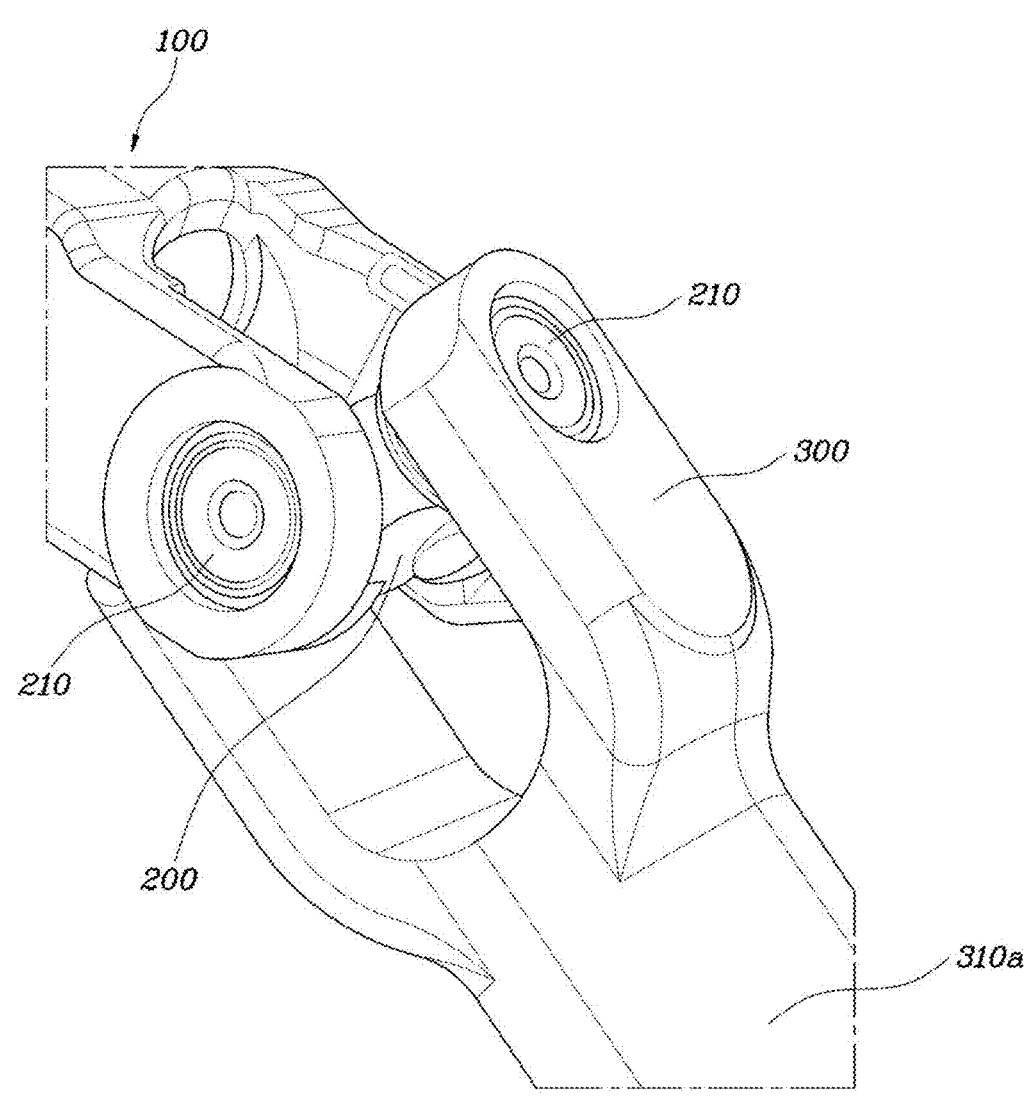
FIG. 7 is a view illustrating another yoke integrally formed with an intermediate shaft according to an embodiment of the present disclosure.

In one embodiment, as illustrated in FIGS. 3 and 7, an intermediate yoke 300 is connected to the yoke 100 via a spider 200 having a bearing 210, and an intermediate shaft portion 310 is integrally formed with a body portion 302 of the intermediate yoke 300.

The intermediate shaft portion 310 may have a solid shaft 310*a* shape or a hollow shaft 310*b* shape.

In other words, the intermediate yoke 300 connected to the upper yoke 100 may be integrally formed with the intermediate shaft portion 310 having a solid shaft 310*a* shape, and the intermediate yoke 300 connected to the lower yoke 100 may be integrally formed with the intermediate shaft portion 310 having a hollow shaft 310*b* shape.

To be more specific, the frictional force is usually determined by the size of the hollow portion 121 formed in the yoke. In other words, when the size of the hollow portion 121 increases, the pressing force decreases and the frictional force is reduced.

However, if the size of the hollow portion 121 is excessively large, the steering feel may deteriorate or noise may be generated due to an increased lash between parts.

In particular, when the yoke is welded to the shaft, the roundness of the hollow portion 121 may be affected if thermal deformation occurs in the hollow portion 121, leading to an undesired increase of the frictional force.

Accordingly, according to the present disclosure, the intermediate yoke 300 and the intermediate shaft portion 310 are integrally formed rather than welded together so that an increase of the frictional force is blocked before the bolt 113 is fastened. As a result, the overall friction in the universal joint 10 is reduced.

Figure 11:
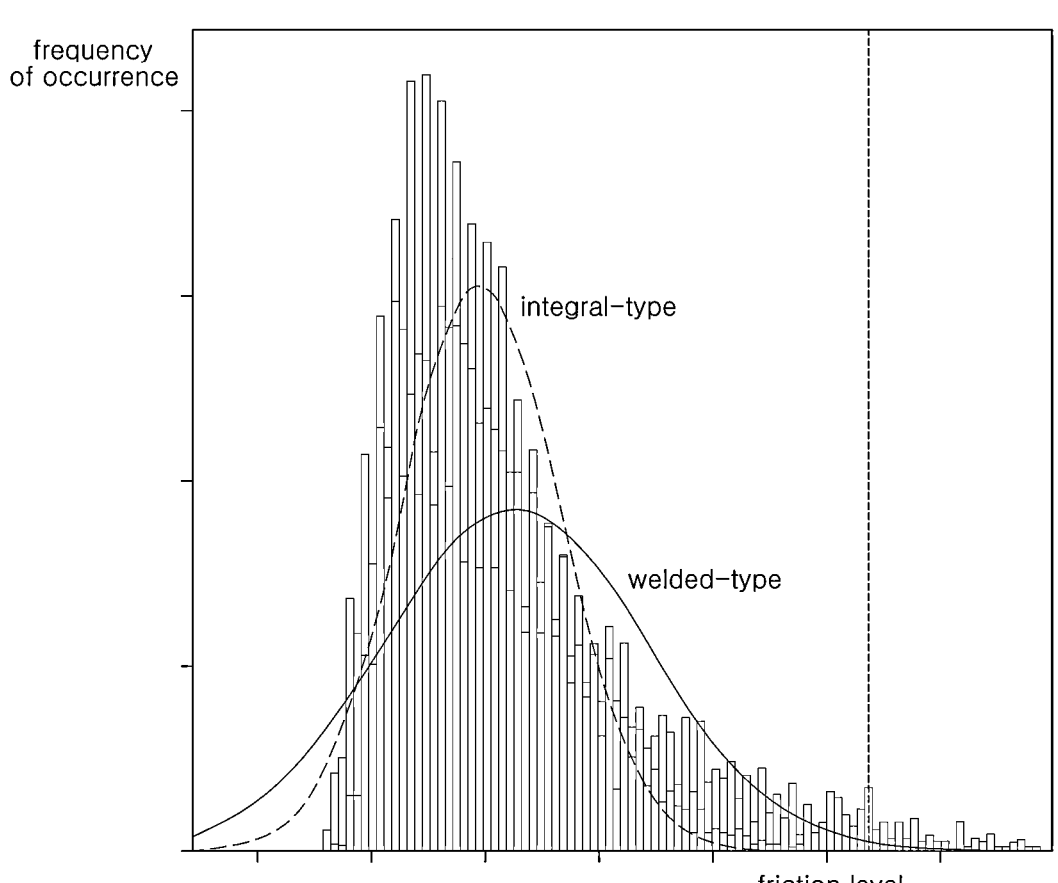
FIG. 11 is a graph comparing friction distributions of a universal joint with the integral-type yoke in FIG. 7 and a universal joint with a conventional welded-type yoke.

FIG. 11 is a graph comparing friction distributions of a conventional welded-type yoke in which the intermediate yoke 300 and the intermediate shaft portion 310 are welded together and an integral-type yoke in which the intermediate yoke 300 and the intermediate shaft portion 310 are integrally formed.

As illustrated in the graph, it can be seen that the thermal deformation in the yoke occurring in the welding process is absent in the integral-type intermediate yoke 300 unlike the welded-type intermediate yoke so that the average and distribution of the bending torque are reduced.

As described above, according to the present disclosure, when the bolt 113 is fastened to the yoke 100, the stress causing the deformation concentrates in the rigidity-weakening portion 130 even if the body portion 110 in which the bolt 113 is assembled deforms so that deformation in the hollow portion 121 in which the bearing 210 is assembled is substantially reduced or prevented. Accordingly, the amount of increase of the bending torque is reduced and thus the friction in the universal joint 10 is reduced. As a result, the steering friction of an actual vehicle is reduced.

Further, the intermediate yoke 300 and the intermediate shaft portion 310 are integrally formed rather than welded together so that an increase in the frictional force is blocked before the bolt 113 is fastened. As a result, the overall friction in the universal joint 10 is reduced.

Only specific embodiments of the present disclosure have been described in detail, but it should be obvious to those having ordinary skill in the art that various modifications and revisions are possible within the scope of the technical spirit of the present disclosure and it is natural that such modifications and revisions fall within the scope of the appended claims.

What is claimed is:

1. A universal joint comprising:
a body portion formed at a first end of a yoke for a shaft to be coupled thereto;
a wing portion formed at a second end of the yoke for a bearing to be pressed thereinto; and
a rigidity-weakening portion formed in a portion extending from the body portion to the wing portion and having a reduced cross-sectional area,
wherein the rigidity-weakening portion is formed in a shape extended from the body portion to the wing portion and having a concave outer surface,
wherein a slit is formed in a radial direction of a shaft hole formed in the body portion,
wherein the slit is formed between rigidity-weakening portions, and
wherein a hollow portion side end of the slit is positioned at a least thick portion of the rigidity-weakening portion.

2. The universal joint of claim 1, wherein a radius of a concave shape of the concave outer surface ranges from 6 to 14 mm.

3. The universal joint of claim 1, wherein a concave shape of the concave outer surface is formed on right and left sides of the wing portion respectively.

4. The universal joint of claim 1, wherein the concave outer surface is symmetrically formed on right and left sides of the wing portion.

5. The universal joint of claim 1, wherein the least thick portion of the rigidity-weakening portion is formed at a position a predetermined distance away from a n edge of the hollow portion.

6. The universal joint of claim 1, wherein an inner diameter of the shaft hole ranges from 16 to 18 mm, and an outer diameter of the body portion forming the shaft hole ranges from 25 to 27 mm.

7. The universal joint of claim 1, further comprising:
an intermediate yoke connected to the yoke via a spider having a bearing; and
an intermediate shaft portion integrally formed with a body portion of the intermediate yoke.

8. The universal joint of claim 7, wherein the intermediate shaft portion has a solid shaft shape or a hollow shaft shape.

* * * * *